United States Patent [19]

Hannon et al.

[11] Patent Number: 4,688,244

[45] Date of Patent: Aug. 18, 1987

[54] INTEGRATED CARGO SECURITY SYSTEM

[76] Inventors: Marwan Hannon, 956 Foothill Dr.; Mark L. Denekamp, 1779 Sweetwood Dr., both of Colma, Calif. 94015

[21] Appl. No.: 929,391

[22] Filed: Nov. 10, 1986

[51] Int. Cl.$^4$ .............................................. H01Q 7/04
[52] U.S. Cl. ..................................... 379/58; 235/385; 235/375; 340/825.35; 379/44; 379/59
[58] Field of Search ............... 235/385, 384, 383, 375; 340/825.35; 379/44, 58, 59

[56] References Cited

U.S. PATENT DOCUMENTS

| | | | |
|---|---|---|---|
| 4,300,040 | 11/1981 | Gould et al. | 235/381 |
| 4,340,810 | 7/1982 | Glass | 235/375 |
| 4,455,483 | 6/1984 | Schönhuber | 235/375 |
| 4,558,318 | 12/1985 | Katz et al. | 340/825.34 |
| 4,621,325 | 11/1986 | Naftzger et al. | 364/406 |
| 4,631,357 | 11/1986 | Grünig | 379/40 |
| 4,635,053 | 1/1987 | Banks | 340/825.31 |
| 4,636,634 | 1/1987 | Harper | 250/223 R |
| 4,636,950 | 1/1987 | Caswell et al. | 364/403 |
| 4,646,343 | 2/1987 | Chen | 379/40 |

Primary Examiner—Robert Lev
Attorney, Agent, or Firm—David B. Harrison

[57] ABSTRACT

An integrated cargo transportation security system is provided for a fleet of enclosed cargo transportation containers. Each container includes a subsystem including a door sensor for sensing access door opening and closure, a module unit including a connecting frame for a removable module and cabling leading to the door sensor. The identically appearing removable modules are of two types: active and passive. Each locks into the unit. The system includes a central data collection and processing facility for processing cargo trip data collected by at least one active module during a cargo trip of the container into a roadmap indicating travel route of the container during the trip and the time and location of significant events such as unauthorized opening of the cargo door. The module unit having an active module includes a self contained power supply, an incremental distance detector for detecting incremental distance travelled by said container, a direction sensor for sensing the direction of travel of the container during the trip, a clock, a central processor for generating a sequence of status numbers indicative of accumulated incremental distance, direction, time and door status, and a memory for storing the sequence during the trip. The system further includes means for transferring the status number sequence to the central data collection and processing facility. A radio link may be provided to connect the container module to the central data facility in real time, and may be operated by authorized personnel at the container to signal predetermined conditions to the central facility.

16 Claims, 3 Drawing Figures

4,688,244

INTEGRATED CARGO SECURITY SYSTEM

FIELD OF THE INVENTION

The present invention relates to security systems to protect cargo during transportation. More particularly, the present invention combines passive deterrence features with active event recordal, analysis and alarm features to provide an improved integrated cargo security sysem.

BACKGROUND OF THE INVENTION

The problem associated with cargo losses has been present since the earliest of times. Ever since valuable cargos have been transported over land or sea, and more recently through the air, the temptation has been presented to those who handle such cargos to misappropriate all or a portion of the cargo. Piracy of cargos is also of ancient origin, and continuos today.

Modern cargo security systems for protecting cargo from unauthorized tampering, theft, alteration or deliberate contamination typically employ passive and active safeguards and deterrents, and combinations thereof.

One well known example of a passive safeguard is a looking mechanism by which the cargo is looked inside of a enclosed container. Anyone, whether authorized or unauthorized, who possesses a key or combination may intrude the locked space without detection or recordal of the event. Also, locks may be tampered with, picked and/or physically removed, so that their deterrent effect is recognized to be limited. Seals are also used to deter employees or other insiders from unauthorized access to the cargo within the enclosed container.

One well known example of an active safeguard for stationary premises, such as a cargo warehouse, is an alarm system which senses suspicious events and generates a local alarm or a silent alarm which is sent to a central security agency for further investigation. The alarm system may employ an annuciator such as a horn, light or siren. Such alarm systems are easily disabled, particularly by those who are familar with their structure and function.

Fairly sophisticated security systems for transportation containers for cargo include devices which sense and record mechanically activities and events of the cargo container. For example, U.S. Pat. No. 2,051,986 to H. R. Cool describes a door activities recorder. This device created a record of door activities by recording the opening and closure of the door. A stylus coupled to the door records opening and closure events on a paper record disk which is slowly rotated by a clock motor. The rotations are calibrated, and it is possible later, and with considerable effort, to decipher the recorded markings by time, thereby ascertaining approximately the time and date when the cargo access door was opened and closed.

A later invention by K. A. Cool, described in U.S. Pat. No. 2,616,778, provided a mechanical stylus which punctured the cardboard recording disk, thereby providing a more fixed and permanent record of events, which was less susceptible to alteration or tampering by the driver, etc.

A further variant of the clock recorder is found in U.S. Patent No. 3,720,843, to Smith. The Smith patent discloses a combined vehicle activities and cargo door activities recorder. Therein, a disk chart recorder operated by a clock motor records the status of the vehicle as in motion or at rest, and when the cargo doors are opened and closed; different stylus markings being provided for the opening and closing events.

A drawback of all wind-up clock motors is that they may not keep accurate time. Also, they may stop running, or be stopped or slowed by tampering, and thus yield an inaccurate record of events.

Another drawback of helical records on disks as provided for example by the foregoing systems was the difficulty and considerable time required in decoding and reconstructing events after the fact, should the need arise.

A more sophisticated cargo security device is described in the U.S. Pat. No. 3,792,493 to Hughes. This reference teaches an electronic "black box" device which is installed in a cargo transporting vehicle or container. It contains its own battery power supply which is charged by the vehicle charging system. It includes an electronic clock, cargo door sensor, and a memory element in which the times of door opening/closure events are digitally stored. The memory element operates a visual display and may also drive a chart recorder for providing a hard copy record of door activity. This system simply translated to digital processing the recording and monitoring activities which had previously been carried out with the prior helically graphed records described in the Cool references above.

Recently, vehicle navigation devices have been proposed for simultaneously sensing vehicle direction and speed and for displaying vehicle location in relation to a map display generated electronically. One such system, the ETAK NAVIGATOR manufactured by Etak, Inc., Menlo Park, Calif. employs solid state flux gate sensors to detect the direction in which the vehicle is travelling. This system presents to the driver a road map of the general vicinity which is generated from prestored data. The map is presented on a suitable display. While this system achieves its purpose, it is very complicated and expensive: each unit in the vehicle must contain a wide variety of prestored programs corresponding to road maps of the area of travel. The wider the area, the more extensive the requirement for prestored data in order to render the system operative.

A hitherto unsolved need has arisen for an integrated cargo transportation security system for a fleet of cargo containers, such as truck trailers, which is capable of recording data relating to a cargo transportation event or trip by real time, direction and distance of travel, and by the occurrence of unauthorized events, such as unauthorized opening of a cargo door, and which lends itself to rapid signalling, and decoding and display mapping of the trip course on a roadmap with significant events clearly charted.

SUMMARY OF THE INVENTION WITH OBJECTS

An object of the present invention is to provide a tamper-proof cargo security module which enables real time data collection to detect, stop and deter cargo losses in a manner which overcomes limitations and drawbacks of the prior art.

Another object of the present invention is to collect data in real time in a manner which may be processed into a map to depict a reconstruction of a particular cargo transportation trip.

A further object of the present invention is to provide a tamperproof and fireproof security module which employs a programmed microprocessor to supervise collection of data in a manner which overcomes limitations and drawbacks of the prior art.

One more object of the present invention is to provide a security module which obtains and stores highly relevant data relating to cargo losses, including video and audio signal tracks during an interval of unauthorized access to a cargo container with which the module is associated.

A further object of the present invention is to provide an integrated, highly computerized, interactive event analysis security system wherein a digital record collected and stored in real time during a cargo transportation trip may be decoded and plotted as a transparent overlay for a roadmap for displaying the locus of the trip with significant events marked on the overlay.

One more object of the present invention is to provide security modules of various types and capabilities with identical exterior appearances for each container of a fleet wherein a particular module may be configured by security personnel to have none, some or all functional features and aspects of a cargo transportation security system, in order to maximize deterrent impact with reduced cost.

A still further object of the present invention is to provide a security module for a cargo transportation trailer which includes a silent radio alarm actuable by the driver to signal the time, nature and location of distress conditions such as hijacking or breakdown to a central security data collection and processing facility.

An improved integrated cargo transportation security system is provided for use with a fleet of enclosed cargo transportation containers. Each container has at least one access door enabling cargo to be loaded and unloaded to and from the enclosed interior thereof. The security system includes in the cargo compartment of each container a uniformly apparing, selectively configurable container security module. The module preferably includes two parts, a first part secured to the container, and a second part which is removable from the container. The first part acts as a receptacle for the second part and comprises a frame suitably secured to an inside upper wall of the cargo container at a location affording an inside view of the cargo access door and area. The first part includes wiring and may include or be connected to a storage battery or other suitable source for power, such as photocells on the container roof. Alternatively, a storage battery may be included within the second part. The second part includes a space and wiring for receiving and connecting active circuit elements of the security system module and has a one-way light transmissive window for a television camera/recorder function.

The container typically includes sensors located on each door to determine whether they are open or closed. A mechanism is provided to record the distance the container has been transported. When the container is a truck trailer, a generator may operate in conjunction with a wheel thereof so as to generate charging current for a battery power supply as well as to provide an incremental distance signal. The security system module includes a magnetic compass, and may also advantageously include a cellular mobile telephone enabling real time communication with a central security data processing center.

A central processing unit in the container module periodically scans all sensors to which it is attached and periodically generates a status number, such as at each eighth of a mile of distance travelled. Alternatively, status numbers may also be generated any time there is a change in status, whether it be a door opening unexpectedly, a change of direction or stopping for longer than the expected time for a traffic signal. A real time clock adds a date/time tag to each status number, which is then stored in active storage within the security module.

When an unauthorized event occurs during the trip, such as the opening of a cargo door en route, the security module may operate the video camera recorder, and it may initate a call over a cellular radio link to a central security facility. As much information as practical is recorded during the duration of predetermined events, such as door openings. Video and sound data may be collected and stored during such events.

The status number information collected during the trip may be downloaded to the central security facility during the trip, or at the conclusion thereof. A record of the status numbers in sequence is transferred to the central security facility.

The central security facility includes a computer which translates the sequence of status numbers into a trip plot, preferably plotted to scale on transparent material which is then overlayed onto a map having any given scale set into the computer. Any significant events during the trip are also recorded on the plot, which may be copied and distributed to security personnel for further investigation of cargo losses.

In an important aspect of the present invention, not all modules need be fully configured, even though they appear to transportation personnel to be identical in appearance and function. This selective configuration capability creates the maximum deterrent impact against cargo thefts by transportation personnel while reducing total capital outlay requirements for the overall security system.

In another important aspect of the present invention, the inclusion of a radio-telephone in association with a trailer security module and actuable by the driver enables a silent alarm to be sent to the central data collection and processing facility in the event of a hijacking or breakdown. When activated, this feature sends trailer location and status number to th central facility where security personnel are automatically alerted and may dispatch appropriate aid to the location.

Those and other objects, aspects and features of the present invention will be further understood and appreciated upon consideration of the following detailed description of a preferred embodiment, presented in conjunction with the accompanying drawings.

DETAILED DESCRIPTION OF A PREFERRED EMBODIMENT

Figure 1:
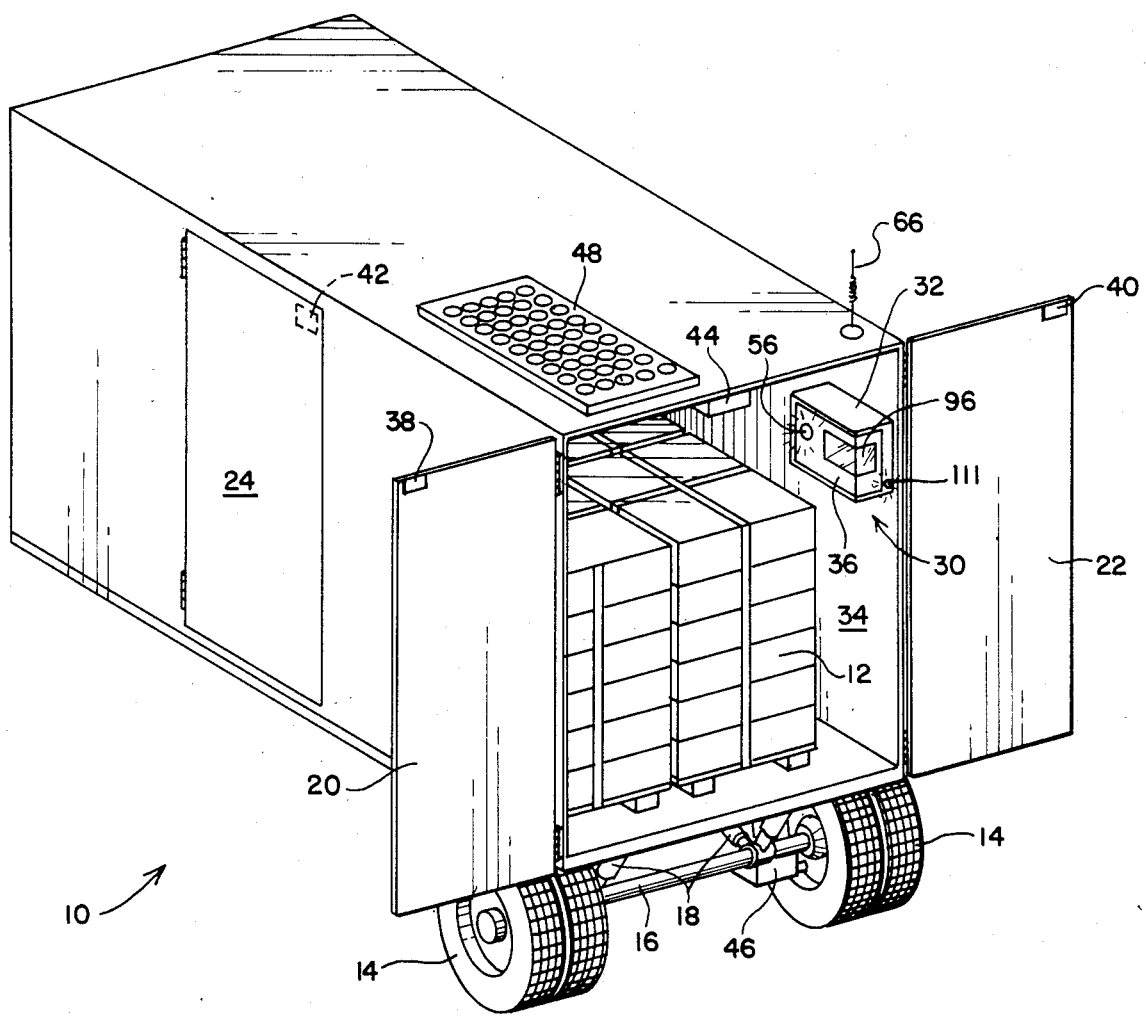
FIG. 1 depicts a cargo container, such as a truck trailer, which has been outfitted with cargo security monitoring and loss deterrence equipment in accordance with principles of the present invention.

With reference to FIG. 1, a cargo container 10 includes multiple pallets of boxed cargo 12 to be protected during transport in accordance with principles of the present invention. Typically, the boxed cargo 12 may comprise imported high value consumer items such as stereo, television, video cassette recorder (VCR), cameras, etc. These are typically small volume, high value appliances, and have been found to be particularly susceptible to loss during transit.

The cargo container 10 is illustrated as a typical enclosed truck trailer having wheels 14, an axle 16, and a suitable suspension 18. Alternatively, and with little modification, the container 10 may be of the sea-going type which does not include a carriage of wheels, axle, suspension, frame, etc. However, since tampering occurs most frequently with truck trailers, the container 10 is shown as a trailer. Two hinged rear cargo access doors 20, 22, and a hinged side cargo access door 24 are typically found in such trailers 10. The doors 20, 22 and 24 are provided with suitable locking devices which may include hasps and padlocks. Seals may also be used through the hasps as a first and conventional deterrent against cargo loss and tampering.

SECURITY UNIT 30

In accordance with the present invention, the container 10 is outfitted with a security module 30 of hardened (tamperproof and fireproof) construction, such as heavy gauge metal. The module 30 is of a two part construction: a first part 32 which is securely attached to an inside sidewall 34 of the trailer 10, and a second part 36 which is removable by security personnel and which may include specialized cargo monitoring equipment, depending upon the nature of the cargo and the nature of the transportation route. The second part 36 is also of hardened construction and slides into the first part 32 on a suitable guide track or groove, and it is locked into the first part by a key lock operable by authorized security personnel. The second part 36 includes suitable electrical connectors which mate with connectors of the first part and thereby bring about an electrical integration and interconnection of the elements of each part 32, 36.

There are certain additional elements which are installed in the trailer 10 and are connected to the module 30 via hardened wiring as in heavy gauge metal conduits. There are e.g. three door sensors 38, 40 and 42, operatively associated with the three doors 20, 22 and 24 respectively. The sensors may comprise permanent magnets embedded inside each door. Hall Effect solid state detectors 44 may be positioned to sense the magnetic fields generated by the magnets when the doors are in their closed position. Signals from the detectors 44 are sent to the module 30.

Figure 2:
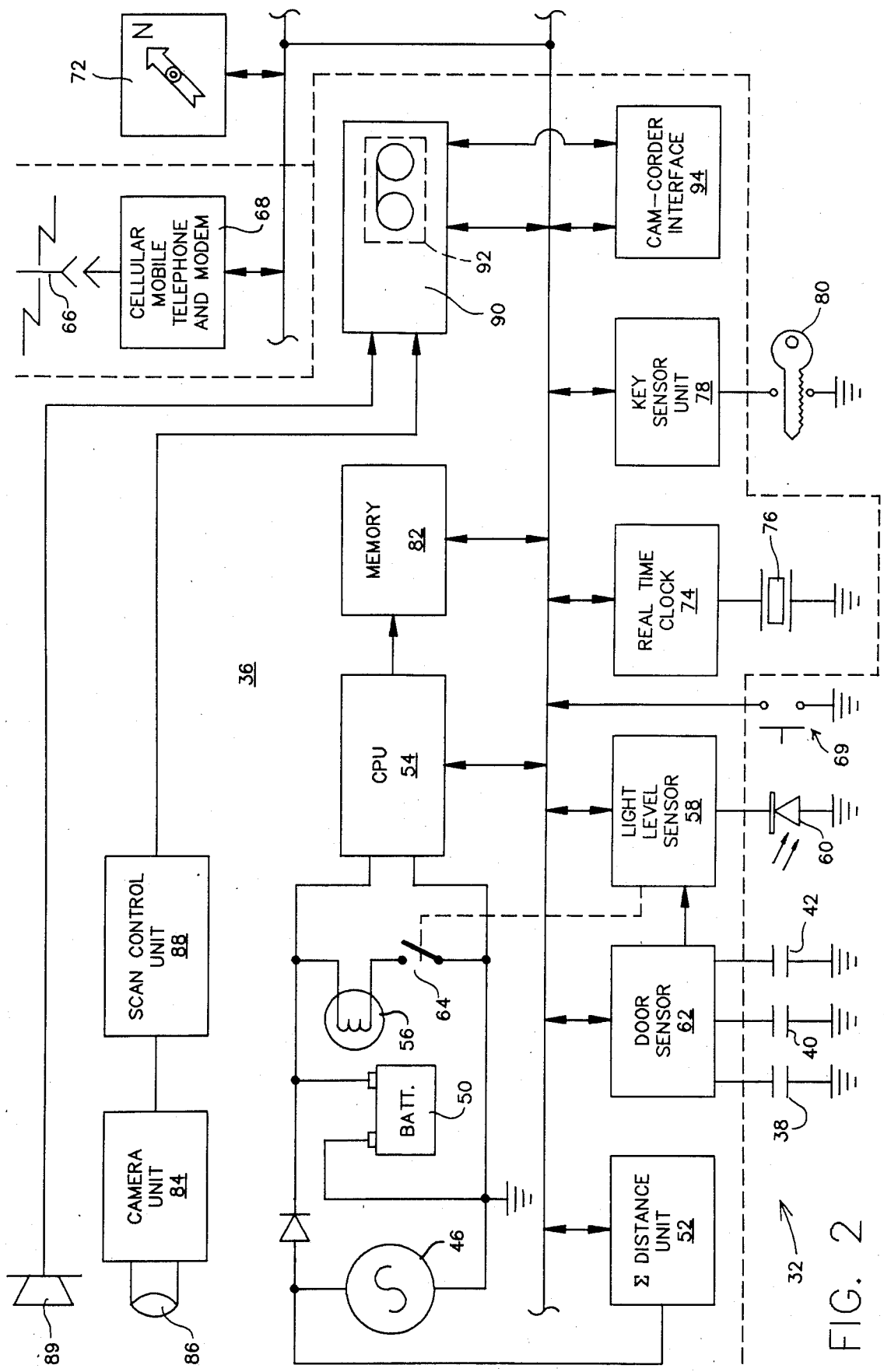
FIG. 2 is an electrical schematic and block diagram of the cargo security monitoring and loss deterrence equipment depicted in FIG. 1.

An AC generator unit 46 is operatively associated with at least one of the wheels 14, as shown in FIG. 1. This generator unit 46 provides two important functions. First, it generates electrical charging current for charging a stored energy device such as a rechargeable wet cell or gel-cell storage battery 50 contained in the first part 32 or second part 36, or elsewhere in association with the container 10 (and shown schematically in FIG. 2). Solar cells 48 on the roof or upper sidewall of the container 10 may be used to provide charging current to the battery 50 in lieu of the generator unit 46, or in addition thereto.

The second function provided by the AC generator unit 46 is a tachometer for generating an incremental distance signal corresponding to rotation of the wheel 14 with which the generator unit 46 is operatively associated. The distance signal is summed by a summing unit 52 and processed by a central processing unit 54 to provide distance information during transit of the cargo 12. A third function provided by the generating unit 46 is to provide a simple indication as to when the trailer 10 is in motion in transit, and when it is at rest during the trip.

One or more cargo lights 56 may be provided inside of the trailer 10 to illuminate the cargo area at night or during low light conditions. Preferably, the lights 56 are included as an integral part of the module 30. An ambient light level sensing unit 58 operates in response to a light detector 60. The sensing unit 58 also responds to a signal from a door sensor signal processing unit 62 which supervises the door sensors 38, 40 and 42 and which converts sensor information into digital information for use by the CPU 54. The light level sensor unit 58 operates an electronic switch 64 which turns on the lights 56 whenever a door 20, 22 or 24 is opened, and whenever ambient light levels are low, as at night time.

Figure 3:
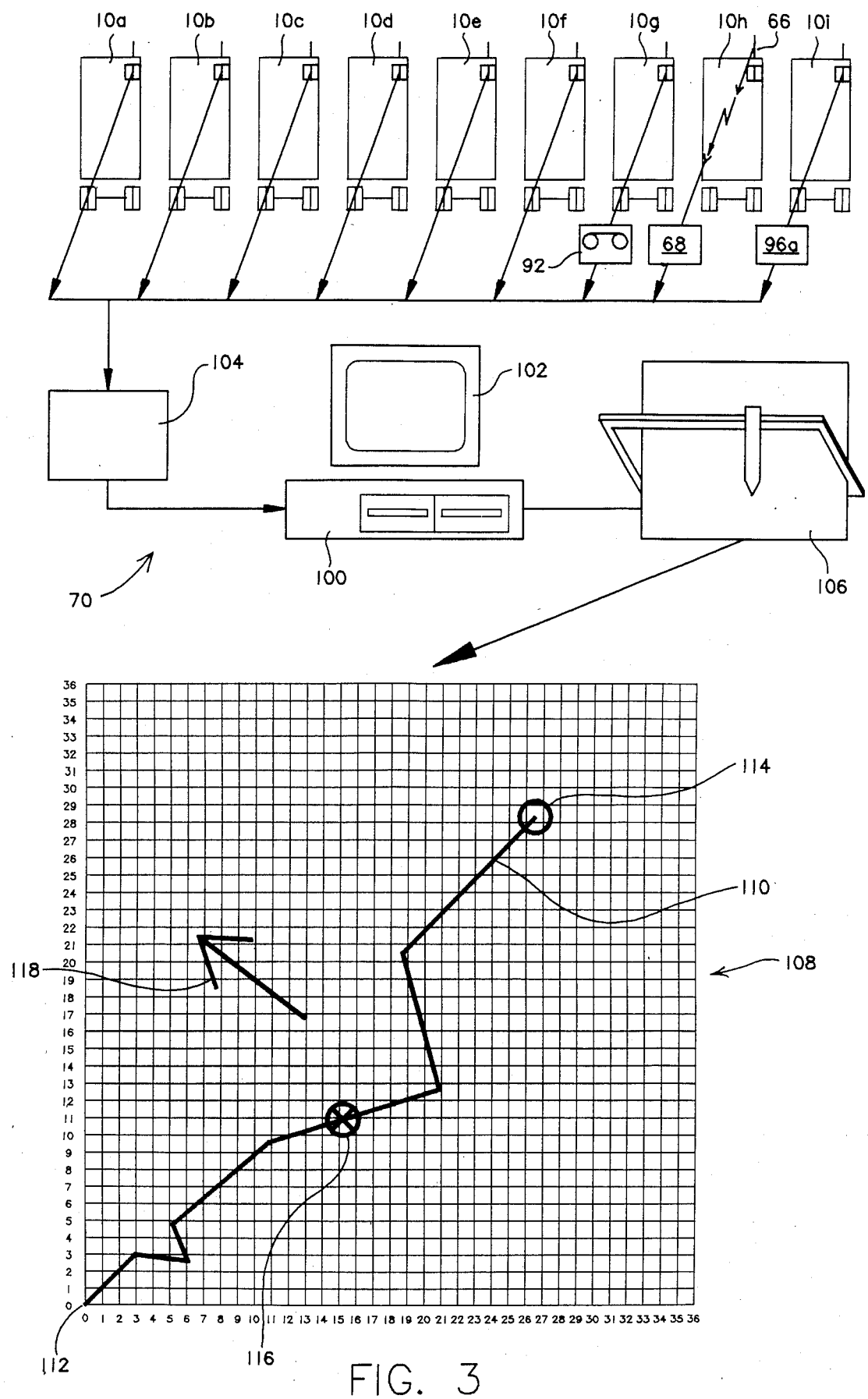
FIG. 3 is a schematic diagram of a system for cargo security monitoring in accordance with principles of the present invention.

An antenna 66 for a cellular mobile telephone unit 68 may be installed at the roof of the trailer 10. The unit 68 is preferably an accessory which may be included optionally in the module 30, and it provides automatic full duplex communications between the unit 30 in the trailer and a computerized central security monitoring and control location 70 (FIG. 3). Cellular communications is an appropriate configuration for the security system when the course of transit for the cargo is within a metropolitan area served by cellular telephone service. For long haul rigs, high frequency public service radio channels and a more extensive antenna may be provided.

With the radio telephone feature, a call may be placed by the central facility 70 to the trailer unit 30 at any time, and the unit 30 thereupon responds by transmitting accumulated data through the internal modem of the cellular telephone 68 to the central facility 70. Alternatively, and of equal importance, a call may be placed by the trailer unit 30 upon predetermined conditions, such as periodically during the trip duration, or upon occurrence of predetermined events such as cargo door opening, or in the event of a hijacking or rig breakdown by virtue of a control pushbutton switch 69 operable by the driver from the tractor cab. The number of times the button 69 is depressed determines the particular situation, whether hijacking or mechanical failure, illness of the driver, or other. The signalling sequence is processed by the CPU 54 and used to generate a status number sent through the cellular telephone 68 to the central facility 70.

A directional magnetic compass unit 72 is includable with the module 30. The compass unit 72 provides digital information in real time corresponding to the magnetic heading orientation of the trailer 10. It is calibrated when the second part 36 is installed in order to cancel any effects of magnetic fields associated with the trailer and/or its cargo.

A real time clock 74 is associated with the module 30 and it has a precise frequency determining element 76, such as a crystal. The clock 74 generates digital real time signals and supplies such signals to the CPU 54 in accordance with program control thereof.

A key sensor unit 78 associated with the module 30 detects when the second part 36 is locked into its proper position within the frame 32 in accordance with a key switch. The sensor unit 78 also determines the particular characteristics of the container, such as number and location of door sensors, generator, etc., and it supplies this information to the CPU 54 so that it may make full use of the particular configuration installed as the second part 36.

The CPU 54 directly addresses an active memory unit 82 which contains program instructions executed by the CPU and which also stores accumulated data relating to events occurring during a particular trip. The memory unit 82 is of sufficient size to accumulate all of the data needed to reconstruct the particular trip at the central facility 70. This data is accumulated locally at the module 30 during the duration of the transit of the cargo 12. It may be periodically sent to the central facility 70 over the radio link provided by e.g. the cellular telephone 68, or it may be offloaded after the destination has been reached by authorized security personnel.

In the initial data retrieval operation, the second unit 36 may be physically removed from the container 10 and transported to the central facility 70 or a remote terminal connected to the central facility 70 whereupon the trip data stored in the unit 36 is recovered and sent into the central facility 70 for processing. Alternatively, the security personnel may temporarily connect a data retrieval unit 36a to the installed and configured module 30. The data retrieval unit 36a includes a data recorder which accesses the memory 82 and thereby obtains the accumulated transit data. Then, the operator disconnects the second unit 36a and may reset the module 30 by operation of the key switch 80. This step clears the memory 82 of accumulated transit data, and the unit 30 is now ready to be configured and used in connection with a subsequent cargo transit operation. If data is retrieved at an intermediate stop during a cargo run, then the unit 30 may not be reset after the data retrieval module 36a has been disconnected.

Preferably, the second, demountable part 36 may contain a wide variety of options and features, none of which are visibly apparent from the outside appearance of the module 30. One particularly useful feature is the inclusion of video camera/recorder unit, such as a hand held "CAM-CORDER" which includes a camera unit 84, having a lens 86, a scan electrical control unit 88, a microphone 89, and a video cassette recorder unit 90, having a removable taps cassette in e.g. the 8 mm, BETA or VHS format. An interface unit 92 may be provided to convert digital transit data stored in the memory 82 into a format suitable for recording in video cassette format. The interface unit 92 also functions to control all operations of the television camera and recorder. The camera 84 is mounted in the second unit 36 in a manner such that the camera lens 86 is focused on a scene at an appropriate door location, such as the rear doors 20, 22. Also, the direction and depth of focus is such that the scene will be illuminated by the light 56, should camera operation be required under artificial lighting conditions. A high light sensitivity camera is preferred, and under some conditions, an infrared sensitive camera may be employed for very low light conditions.

The module 30 includes a suitable one-way high efficiency light translucent window 96 of hardened material such as thick, tempered, and lightly coated or silvered glass. The window enables the camera 84, when present, to record activities occurring in the scene being viewed, should the nature of the activities or predetermined events indicated that they are appropriate for recording. Sound emanating from the scene may be simultaneously duly recorded with the picture images.

With reference to FIG. 3, the system of the present invention will be appreciated by those skilled in the art. The present security system is advantageously employed with a fleet of identical cargo transporters, such as the truck trailers 10a, 10b, 10c, 10d, 10e, 10f, 10g, 10h, and 10i. Each of these trailers 10 is equipped with a security unit 30 including the first part 32 and the elements described in FIG. 1. Some or all of the elements of a particular unit 30 may be "dummy" units in the sense that they appear to contain the electronics circuitry, camera, cellular telephone, etc.; but, in fact they do not contain such units or all of such units. Dummy units, and minimally functioning units, when used in combination with fully equipped units, serve to deter criminal activity, and if properly and randomly matched and assigned, will be virtually as effective as real units, without requiring the capital expenditures otherwise required to outfit all trailers 10 of the cargo transportation fleet with fully equipped security units 30.

The central unit 70 includes a central computer 100 having a display screen 102, keyboard (not shown), and data entry device 104. The data entry device may be a playback device suitable for receiving a downloading unit 36a and for receiving the transit event data retrieved from one or more units 30 by the downloading unit 36a at the destination. The device 104 may be a data record playback unit for playing back video cassettes recorded with transit event data and images, or it may be a cellular telephone/modem link for accessing a selected trailer unit 30 under program control of the central computer, from time to time during the particular trailer's transit of cargo to the destination.

The computer 100 includes a suitable hard copy data output device, such as a plotter 106, which is useful for preparing reports, such as the trip report 108, in accordance with principles of the present invention.

OPERATION OF THE SYSTEM

Once a shipment of cargo 12 is loaded into a trailer 10, the unit 30 is activated by use of the key switch 80 by authorized security personnel. The CPU 54 immediately and repetitively interrogates all elements of the unit 30 to ensure that they are operating correctly. A visible light source 110 (FIG. 2) such as a green LED indicates to all viewers that the system is armed and functioning (whether or not it is a fully configured system or some abbreviated version thereof).

At predefined intervals and events, the CPU generates a status number that indicates the following information;
1. distance travelled (odometer information obtained obtained from the distance summation unit 52);
2. direction travelled (digital compass heading in degrees from the digital compass 72);
3. date and time the status number is generated (from the real time clock 74);
4. status of the cargo doors (from the door sensor unit 62);

5. whether the trailer 10 is in motion or at rest at the time of the status report (as sensed by the distance summation unit 52 from AC generated by the generator 46 when the wheel 14 is rotating).

This status number is recorded at a suitable memory location in the memory 82, and it is generated at periodic time/distance intervals or whenever there is any detected change in status. Thus, when a cargo door is opened, a status number is generated and recorded. When it is closed, a status number is generated. While a door is opened, and if the unit 30 includes a television camera, the camera will periodically scan its scene of focus. The minute any change in picture content occurs, caused for example by motion, or in the event there are voice sounds, the video recorder 90 begins recording the scene and/or sounds onto the magnetic tape cassette 92. When there is no further motion, or when the doors are closed, recording ceases. Each recording operation also generates a status number, so that the central computer 100 may determine when during the course of the trip the picture/sound recording was made. The date/time generator 74 may also enter data directly onto the video record to correlate date and time with the scene being recorded.

The status of the cargo container doors 20, 22, 24 is determined to be secure, in alarm condition, or in trouble. The secure condition means that the cargo container doors are closed and that the unit 30 is operating properly. The alarm condition means that one of the cargo doors has been opened before the destination, and that the unit 30 is operating properly. The trouble condition means that the unit 30 has been, or is being tampered with and/or that the unit 30 is not operating properly. A status number is generated and recorded in the memory 82 whenever a door condition changes.

A status number may be generated incrementally, such as at each one eighth mile increment of travel, or more frequently, depending upon the resolution desired and the storage capacity of the local memory 83 provided in the module 30 for recording the data being gathered.

A status number may also or alternatively be generated and recorded in the memory 82 whenever the trailer 10 starts and stops its motion (except for very short intervals indicative of stop lights in traffic), and whenever the magnetic heading of the trailer indicates a change in direction (which is more than a predetermined few degrees of the compass).

When the module 30 is configured to includes a recorder, periodically the data accumulated in memory 82 is transferred to the storage media (which may be the video cassette, or punched paper tape, floppy disk, conventional magnetic disk, perforated fireproof metal foil, etc.)

Whenever the unit 30 is being tampered with, or is exposed to fire, or the alarm switch 69 is actuated, the unit 30 is preprogrammed to transfer all of its data to whatever permanent storage media may be available to it.

At the same time, if it is installed in the particular module 30, the cellular telephone 68 may be activated in an effort to send an alarm message to the central monitoring facility. Such message includes sufficient status numbers to enable the central computer to plot the present location of the trailer sending the alarm message from its original starting position. This information is then relayed by security personnel at the central facility to local law enforcement/fire department, vehicle maintenance personnel for investigation and handling. Alternatively, the truck company may dispatch private investigators to clear the alarm condition.

Upon completion of a cargo transportation trip (transit event), the unit 30 is accessed by security personnel at the destination location. The second part 36 is removed, or the storage media is removed and replaced. Alternatively, a download unit 36a connected to the installed unit 30 and the data in its memory 82 is read out and transferred to the unit 36a. The unit 36a preferably includes a local keyboard, or other input device, so that the trailer/container number or any other pertinent information may be entered into the unit 36a in association with the data being gathered. This collected data is then taken to or sent via remote terminals and communications channels to the central security facility 70.

The central computer 100 calculates a trip plot, such as the trip plot 110 charted on the graph 108 in FIG. 3. The point of origin 112 is plotted as a starting location on the graph 108. Then the status numbers are automatically decoded and are used to develop the trip plot 110 which extends from the starting point 112 to a destination location 114. Preferably, the trip locus 110 is printed on a clear media, such as flexible plastic film, as shown in FIG. 3.

Every predetermined event, such as a change of direction, stopping for more than a traffic signal, or importantly, an unauthorized detour or the opening of a cargo access door, is also clearly marked on the graph 108, as by a special mark 116. Each event is accompanied by a text entry indicating the time/date, nature, duration, etc., of the event, preferably adjacent to the event on the plot. A compass rose 118 indicating magnetic north (or other orientation guide) may also be printed out on the plot 108 as an aid in aligning the overlay with an underlying roadmap.

Preferably, the clear film 108 having the trip line 110 plotted thereon may be overlayed on a roadmap having a predetermined correct scale of the roads/terrain, etc. The trip line 110 is thereby automatically referenced to city/country streets and roads which may be premarked with the planned travel route for the container 10. The entire trip, or any selected segment of the trip may be generated on the clear film overlay 108. Any predetermined event, such as a detour, or a stop or opening of the cargo container 10 is immediately apparent, and sufficient information is at hand to enable security investigation and law enforcement personnel to begin investigating without any delay. Drivers may be questioned at the destination site shortly after arrival and detection of an alarm condition, before they depart. Detours/tempering/cargo loss are actually capable of being detected and stopped during the course thereof by appropriate personnel when the trailer is configured with a real time automatic dial cellular telephone/modem unit 68.

Periodic instruction of those persons responsible for transporting the cargo has a significant deterrent impact because of the versatility and responsiveness of the system to unauthorized activities. Since all units 30 appear to be identical, irrespective of actual capability, the driver or responsible person has no way of knowing just what data, if any, is being sensed and recorded.

CENTRAL COMPUTER CONTROL PROGRAM

The purpose of the central computer control program is to convert status numbers that are generated by the unit CPU 54 into grid numbers and then to cause the grid numbers to be sent to the plotter 106 in a manner which causes the trip line 110 to be plotted on the clear plastic grid 108. The trip route is preferably first plotted as a series of dots, followed by lines interconnecting the dots. Each dot corresponds to a status number originally recorded by the unit 30 during the transit event. The date and time and nature of the status number is displayed next to each dot corresponding to the number.

As shown in FIG. 3, the grid 108 comprises 36 horizontal and 36 vertical lines, defining one inch squares. Grid coordinate numbers consist of a letter designating the particular grid, followed by a two digit vertical coordinate, followed by a two digit horizontal coordinate. Digital fractions may be included with each coordinate to provide further accuracy. One example of a grid coordinate number is A02.03 05.22, wherein A designates the particular grid, 02.03 designates the vertical coordinate, and 05.22 designates the horizontal coordinate.

A large (38 inch by 38 inch) clear plastic grid plan is used with a scale map in order to determine the starting grid location. Multiple grids may be employed, depending upon the scale of the map and the distance between starting point and destination. The computer is capable of enlarging or reducing the plot 108, in order to accomodate the scale of the road or terrain map to be overlayed by the trip plot 110.

A variety of different reports and plots may be generated, based on menu driven parameters obtained from the central computer operator. For example, the plot may be of a selected portion of the trip, or it may be a complete trip plot. A cargo access status report may be generated in situations where there are many transit events occurring simultaneously. In this situation, incoming data accumulated from units 30 for e.g. a particular day is scanned. If any data reveals that a cargo door has been opened inappropriately, the status number revealing such fact is printed out, such as date and time of open door condition, elapsed time from starting point. If desired, the particular trip data file is then retrieved, and a plot is made of that trip, in order to determine further details of the unauthorized door opening.

In carrying out a plotting function the central computer 100 carries out the following steps:

1. The particular trip file is placed in active memory, and the status numbers are all converted into grid numbers in accordance with user menu selections which determine scale, resolution, trip segment or time of interest.
2. The starting coordinates are determined from starting point information obtained from cargo bills of lading, etc., or otherwise obtained from cargo transportation personnel or files and loaded into the central computer in association with the trip file.
3. Using the starting coordinates as a starting point, the central computer processes each selected status number in its sequence (based on a selection from a user menu presented at the user console of the central computer) as follows:
   a. Based on a present scale for mileage, the status number elapsed distance and starting point magnetic heading is converted into an analogous vector for the trip plot from the starting coordinates to the first status number.
   b. Using the first status number as a starting point, the next vector segment for the trip plot is then made based on distance information from the second status number and heading information from the first status number.
   c. This process is repeated for each status number, until an entire trip plot is achieved.
4. If a particular trip plot 110 exceeds the dimensions of a partcular grid, the plot is continued into another adjacent grid, as defined by the grid plan.
5. Once this process has been completed within the computer 100, the operator may then command a particular plot, such as "cargo route", or "alarm/-trouble conditions". In either case, the computer 100 will send appropriately formatted data to the plotter 106 which in turn plots out the trip line 110. Various colors may be used to indicate different status conditions.

Having thus described an embodiment of the present invention, it will now be appreciated that the objects of the invention have been fully achieved, and it will be understood by those skilled in the art that many changes in construction and widely differing embodiments and applications will suggest themselves without departing from the spirit and scope of the invention, as more particularly defined by the following claims. The disclosures and the description herein are purely illustrative and are not intended to be in any sense limiting.

We claim:

1. An integrated cargo transportation security system for use with a fleet of enclosed cargo transportation containers, each container having at least one access door enabling cargo to be loaded and unloaded, the system including for at a said container:

door sensor means for sensing and putting out a door status signal when the access door is open and when it is closed, a module unit associated with the container, each module unit including means for receiving a removable module and including cabling leading to said door sensor means, a removable module for each module unit lookable mounting into a housing of the unit by security personnel, a central data collection and processing facility for receiving cargo trip data collected by at least one active module during a cargo trip of a said container of the fleet and for processing the cargo trip data into a roadmap indicating travel route of the said container during the trip and time and location of significant events such as unauthorized opening of the cargo door during the trip, the said module unit in combination with an active module including a self contained power supply, incremental distance detection means for detecting incremental distance travelled by said container, direction sensing means for sensing the direction of travel of said container, clock means for generating clock signals corresponding to the time interval of the trip, central processing means connected to the door sensor means, the power supply, the incremental distance detection means, the direction sensing means and the clock means for generating a sequence of status numbers indicative of accumulated incremental distance, direction, time and door status, and any tampering with the module unit, and memory means for storing the said sequence during the trip, the system including means for transferring the sequence stored in the memory means to the central data collection and processing facility.

2. The integrated cargo transportation security system set forth in claim 1 wherein all containers of the fleet include door sensors and module units, wherein all of said modules for said units have identical external appearances, and wherein at least one of said modules available for installation in a said module unit comprises a passive module including a housing without containing including any of said incremental distance detection means, direction sensing means, clock means, central processing means, and memory means, the passive module upon installation by security personnel in a said container functioning to provide passive deterrence only against cargo tampering and loss.

3. The integrated cargo transportation security system set forth in claim 1 wherein the active module unit is located inside of the container in view of the access door after cargo has been loaded therein and includes a one way light transmissive portion in view of the access door, the module defining an interior space for housing a picture image recording means.

4. The integrated cargo transportation security system set forth in claim 3 wherein the active module unit includes a picture image detecting means therein under the control of the central processing means for detecting picture images in the field of view when the door sensor means indicates that the cargo door is open during the cargo trip.

5. The integrated cargo transporation security system set forth in claim 4 wherein the picture image detecting means comprises a self contained television camera and recorder including both picture and sound recording capability under the control of the central processing means.

6. The integrated cargo transportation security system set forth in claim 1 further comprising lighting means for lighting the interior of the container, the lighting means being connected to the power supply and under the control of the central processing means.

7. The integrated cargo transportation security system set forth in claim 6 wherein the module unit further comprises ambient light sensing means, for enabling the central processing means to activate the lighting means whenever a cargo door is open and ambient light level is below a predetermined level.

8. The integrated cargo transportation security system set forth in claim 5 wherein said recorder is adapted for recording trip data generated by said module during the container trip.

9. The integrated cargo transportation security system set forth in claim 1 wherein said system for a container comprises radio telecommunications means for enabling transmission to the central data collection and processing facility during a cargo trip, whereby trip data may be obtained by the central data collection and processing facility upon predetermined conditions.

10. The integrated cargo transportation security system set forth in claim 9 further comprising a driver alarm signalling switch for enbling a driver of a rig transporting the container to signal one or more of said predetermined conditions to said module and thence to said central data collection and processing facility.

11. The integrated cargo transportation security system set forth in claim 9 wherein said radio telecommunications means comprises a cellular telephone/auto dial modem under the control of said central processing means.

12. The integrated cargo transportation security system set forth in claim 1 wherein said container comprises a truck trailer, and wherein said incremental distance detection means for detecting incremental distance travelled by said container comprises rotation sensing means responsive to rotation of a wheel of said trailer.

13. The integrated cargo transportation security system set forth in claim 10 wherein said rotation sensing means comprises an AC generator operatively driven by rotation of a wheel of said trailer, said AC generator for detecting incremental distance, and further comprising rectifier means interconnecting said power supply and said AC generator for enabling said AC generator to supply operating and charging power to said power supply during motion of said trailer over the road during the cargo trip.

14. The integrated cargo transportation security system set forth in claim 2 wherein each said module unit includes status indicator means for indicating to personnel responsible for cargo during the cargo trip that the module unit has been activated by security personnel, irrespective of whether or not the module installed is active or passive.

15. The integrated cargo transportation security system set forth in claim 1 wherein said system further comprises a portable data retrieval and recording appliance for connection to a said module at the completion of the cargo trip for transferring the said sequence of status numbers stored in said memory onto a transportable storage media for delivery to said central data collection and processing facility for processing.

16. The integrated cargo transportation security system set forth in claim 1 wherein said module unit in combination with a said active module comprises a data recorder operatively associated with said memory for recording said sequence of status numbers on a removeable media accessible by security personnel for delivery to said central data collection and processing facility for processing.

* * * * *